UNITED STATES PATENT OFFICE.

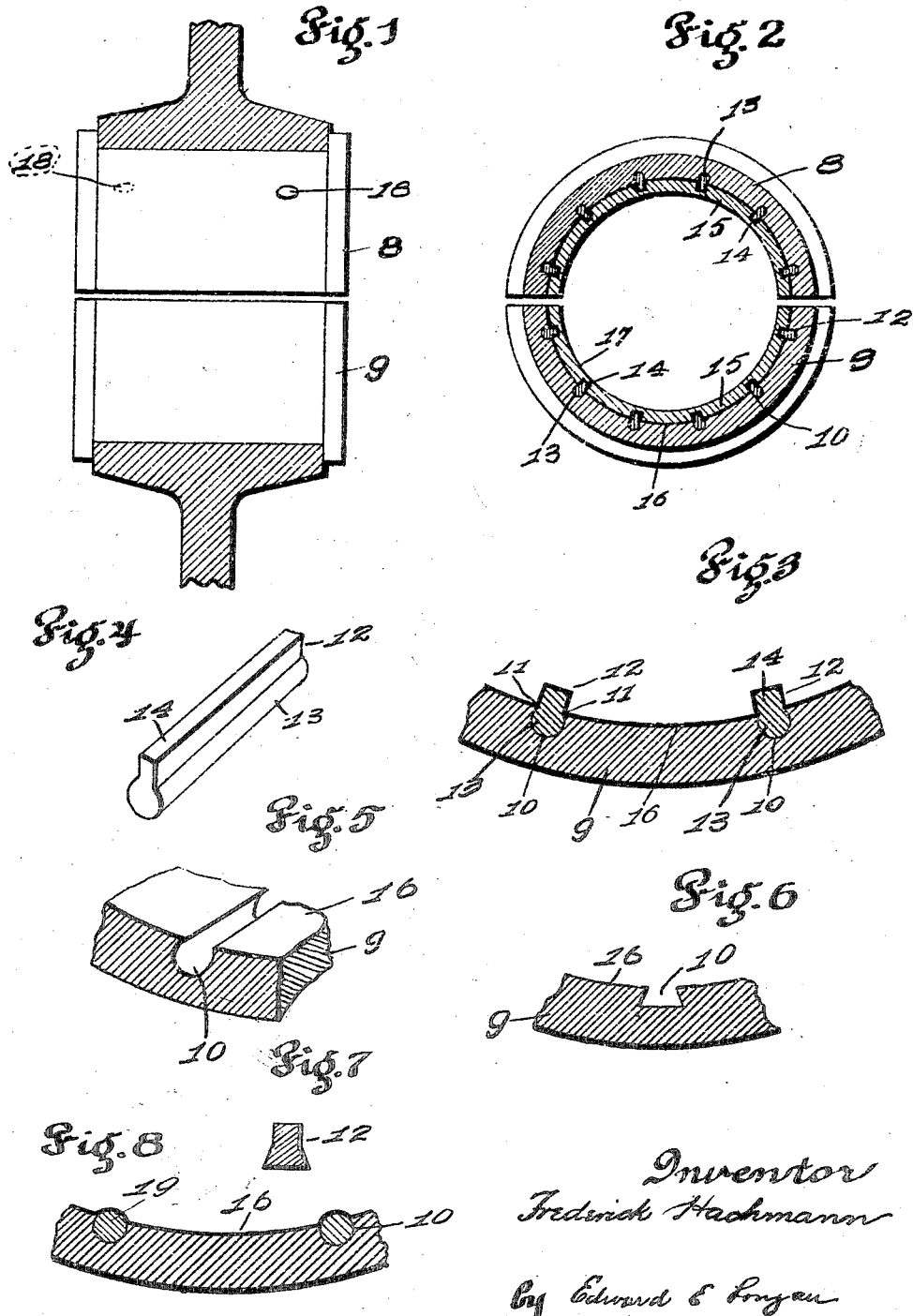

FREDERICK HACHMANN, OF ST. LOUIS, MISSOURI, ASSIGNOR OF ONE-HALF TO HERMAN C. STIFEL, OF ST. LOUIS, MISSOURI, AND ONE-EIGHTH TO DAVID M. HUTCHINSON, OF FERGUSON, MISSOURI.

JOURNAL-BEARING.

1,332,395.    Specification of Letters Patent.    Patented Mar. 2, 1920.

Application filed April 14, 1919. Serial No. 289,832.

*To all whom it may concern:*

Be it known that I, FREDERICK HACHMANN, a citizen of the United States, and resident of the city of St. Louis and State of Missouri, have invented certain new and useful Improvements in Journal-Bearings, of which the following is a specification containing a full, clear, and exact description, reference being had to accompanying drawings, forming a part hereof.

This invention relates to journal bearings and has for its object a bushing which is split in halves, each half being provided with a number of longitudinal grooves in which babbitt retaining ribs are pressed, these ribs being formed of copper bearing material so that when the babbitt becomes worn down to the ribs, the same will act as a bearing and not score or cut the shaft.

A further object is to provide a bearing with babbitt retaining ribs so that it is not necessary to drill anchor holes for retaining the babbitt. In this manner a much thinner bushing can be made use of than would be possible were anchor holes for the babbitt employed.

In the drawings:

Figure 1 is a side elevation of my bearing showing it in position in an engine casing or crank case.

Fig. 2 is a vertical cross section of the bearing.

Fig. 3 is an enlarged fragmental cross section of the bearing before the babbitt has been poured.

Fig. 4 is a perspective view of one of the babbitt retaining ribs made use of.

Fig. 5 is a fragmental perspective view of the groove cut in the bushing for holding the babbitt retaining ribs therein.

Fig. 6 is a fragmental sectional view of a modified form of groove cut in the bushing.

Fig. 7 is a cross sectional view of a modified rib made use of in conjunction with the groove shown in Fig. 6.

Fig. 8 is a fragmental cross section illustrating still another modified form of my device.

In the construction of my device, I provide a bushing which is constructed in halves 8 and 9, each of the halves being provided with longitudinal grooves 10 of slightly more than half a circle in cross section, this form leaving a gripping edge 11 extending along both sides of the groove. Within this groove is inserted the babbitt retaining rib 12 which is provided with a circular portion 13 of the same shape as the groove 10 and an extending portion 14, this extending portion being rectangular in cross section. As clearly shown in Fig. 3, the rectangular or extending portion of the rib 12 forms a sort of dove-tailed space between the two adjacent ribs, this having a tendency to grip or hold the babbitt and prevent it from dropping out of the bushing.

The ribs 12 are pressed into position within the bushing after which the entire concave surface of the bushing, as well as the extending portions of the ribs are tinned. This acts as a binder between the babbitt 15 and the concave surface 16 of each section of the bushing. After the bushing has been tinned, the babbitt 15 is poured into the bushing. This is done in a way well known to the trade and therefore is not described in detail.

After the babbitt has been poured and the bearing surface scraped, the halves of the bushing are placed in position and when the surface 17 of the babbitt 15 becomes worn so that the shaft contacts with the ribs 12, the ribs 12 will act as a bearing surface in conjunction with the babbitt between the adjacent faces of the ribs, the ribs 12 being formed of copper bearing material, which is softer than the shaft which revolves in the bearing.

The upper portion of the bearing is provided with a pair of openings 18, these openings extending entirely through the bushing and babbitt and is countersunk on the interior surface of the babbitt and bushing so that a flat head screw may be inserted therethrough for securing this portion of the bushing to the upper section of the crank case, the head of the screw, however, extending entirely below the surface of the babbitt and at no time coming in contact with the revolving shaft.

In Fig. 8 I make use of the grooves as shown in Fig. 3 but insert a plain round wire 19 therein, thus leaving a portion of the surface of the wire extending beyond the concave surface 16 of the bushing. This will prevent the radial shifting of the babbitt; the tinning of the bushing, as mentioned before, acting as a binder between the babbitt and the bushing.

The primary feature of my invention is to form what might be termed a supplementary bearing after the babbitt has worn down; and also by my improvements, a much cheaper bearing may be produced, because the bushing may be constructed of any metal such as steel or iron, thus eliminating the bronze bushing which is at present used with babbitt lining. In addition to the copper bearing retaining ribs performing the function of supplementary bearing, they also assist in retaining the babbitt in the bearing as previously pointed out.

Having fully described my invention what I claim is:

1. A bearing composed of two complementary sections, each of which is provided with a series of longitudinal grooves, babbitt retaining ribs located in said grooves and extending beyond the interior surface of the sections, a babbitt lining for each section, the said ribs projecting into the babbitt lining.

2. A bearing composed of two complementary sections, each of which is provided with a series of longitudinal grooves, babbitt retaining ribs located in said grooves and extending beyond the interior surface of the sections, a coating of tin placed over the inner surface of each section and the projecting edges of the babbitt retaining ribs, a babbitt lining for each section, the said ribs projecting into the babbitt lining.

3. A bearing composed of two complementary sections, each of which is provided with a series of longitudinal undercut grooves, babbitt retaining ribs located in said grooves and extending beyond the interior surface of the sections, a coating of tin placed over the inner surface of each section and the projecting edges of the babbitt retaining ribs, a babbitt lining for each section, the said ribs projecting into the babbitt lining.

4. A bearing composed of two complementary sections, each of which is provided with a series of longitudinal undercut grooves, babbitt retaining ribs located in said grooves and extending beyond the interior surface of the sections, a babbitt lining for each section, the said ribs projecting into the babbitt lining.

5. A bearing composed of a series of sections of cast steel or iron, each of which is provided with a series of ribs of copper bearing material located on the inside faces thereof and projecting beyond the faces, and a layer of babbitt material formed over and surrounding the exposed faces of said bearing ribs, said bearing ribs acting as a retainer for the babbitt material and as a wearing surfce when the babbitt has become worn.

6. A bearing comprising a steel or cast iron bushing, a series of copper bearing material ribs located on the inside of said bushing and projecting beyond the inside face thereof, and a layer of babbitt material formed on the inside face of said bushing and surrounding the exposed surface of said ribs.

In testimony whereof, I have signed my name to this specification, in presence of two subscribing witnesses.

FREDERICK HACHMANN.

Witnesses:
EDWARD E. LONGAN,
ELIZABETH CARTALL.